United States Patent
Pance et al.

(10) Patent No.: US 8,527,908 B2
(45) Date of Patent: Sep. 3, 2013

(54) COMPUTER USER INTERFACE SYSTEM AND METHODS

(75) Inventors: Aleksandar Pance, Saratoga, CA (US); David Robbins Falkenburg, San Jose, CA (US); Jason Medeiros, Mississauga (CA)

(73) Assignee: Apple Inc., Cupertino, CA (US)

( * ) Notice: Subject to any disclaimer, the term of this patent is extended or adjusted under 35 U.S.C. 154(b) by 577 days.

(21) Appl. No.: 12/238,601

(22) Filed: Sep. 26, 2008

(65) Prior Publication Data

US 2010/0083188 A1    Apr. 1, 2010

(51) Int. Cl.
*G05B 19/18* (2006.01)
*G08B 21/00* (2006.01)

(52) U.S. Cl.
USPC .......................... 715/863; 340/686.6; 700/13

(58) Field of Classification Search
USPC ........................ 715/863; 340/686.6; 700/13
See application file for complete search history.

(56) References Cited

U.S. PATENT DOCUMENTS

| | | | |
|---|---|---|---|
| 3,363,104 A | 1/1968 | Waite et al. | |
| 3,761,947 A | 9/1973 | Volkmann et al. | |
| 4,620,222 A | 10/1986 | Baba et al. | |
| 5,272,473 A | 12/1993 | Thompson et al. | |
| 5,274,494 A | 12/1993 | Rafanelli et al. | |
| 5,337,081 A | 8/1994 | Kamiya et al. | |
| 5,517,429 A * | 5/1996 | Harrison | 342/378 |
| 5,757,423 A | 5/1998 | Tanaka et al. | |
| 5,892,856 A * | 4/1999 | Cooper et al. | 382/291 |
| 6,282,655 B1 * | 8/2001 | Given | 726/34 |
| 6,310,662 B1 | 10/2001 | Sunakawa et al. | |
| 6,339,429 B1 | 1/2002 | Schug | |
| 6,389,153 B1 | 5/2002 | Imai et al. | |
| 6,416,186 B1 | 7/2002 | Nakamura | |
| 6,516,151 B2 | 2/2003 | Pilu | |
| 6,560,711 B1 * | 5/2003 | Given et al. | 726/34 |
| 6,561,654 B2 | 5/2003 | Mukawa et al. | |
| 6,636,292 B2 | 10/2003 | Roddy et al. | |

(Continued)

FOREIGN PATENT DOCUMENTS

| | | |
|---|---|---|
| EP | 167314 | 1/1986 |
| EP | 2053844 | 4/2009 |

(Continued)

OTHER PUBLICATIONS

Author Unknown, "YCbCr," http://en.wikipedia.org/wiki/Y%27CbCr, 4 pages, at least as early as Jun. 17, 2010.

(Continued)

*Primary Examiner* — Tadeese Hailu
(74) *Attorney, Agent, or Firm* — Kendall P. Woodruff

(57) ABSTRACT

Systems and methods may provide user control of a computer system via one or more sensors. Also, systems and methods may provide automated response of a computer system to information acquired via one or more sensors. The sensor(s) may be configured to measure distance, depth proximity and/or presence. In particular, the sensor(s) may be configured to measure a relative location, distance, presence, movements and/or gestures of one or more users of the computer system. Thus, the systems and methods may provide a computer user interface based on measurements of distance, depth, proximity, presence and/or movements by one or more sensors. For example, various contexts and/or operations of the computer system, at the operating system level and/or the application level, may be controlled, automatically and/or at a user's direction, based on information acquired by the sensor(s).

29 Claims, 7 Drawing Sheets

(56) References Cited

U.S. PATENT DOCUMENTS

| | | | |
|---|---|---|---|
| 6,807,010 B2 | 10/2004 | Kowarz | |
| 6,862,022 B2 | 3/2005 | Slupe | |
| 6,877,863 B2 | 4/2005 | Wood et al. | |
| 6,903,880 B2 | 6/2005 | Beatson et al. | |
| 6,921,172 B2 | 7/2005 | Ulichney et al. | |
| 6,924,909 B2 | 8/2005 | Lee et al. | |
| 6,930,669 B2 | 8/2005 | Weiner et al. | |
| 6,931,601 B2 | 8/2005 | Vronay et al. | |
| 6,970,080 B1* | 11/2005 | Crouch et al. | 340/539.26 |
| 7,028,269 B1* | 4/2006 | Cohen-Solal et al. | 715/863 |
| 7,058,234 B2 | 6/2006 | Gindele et al. | |
| 7,079,707 B2 | 7/2006 | Baron | |
| 7,123,298 B2 | 10/2006 | Schroeder et al. | |
| 7,307,709 B2 | 12/2007 | Lin et al. | |
| 7,352,913 B2 | 4/2008 | Karuta et al. | |
| 7,370,336 B2 | 5/2008 | Husain et al. | |
| 7,413,311 B2 | 8/2008 | Govorkov et al. | |
| 7,453,510 B2 | 11/2008 | Kolehmainen et al. | |
| 7,460,179 B2 | 12/2008 | Pate et al. | |
| 7,512,262 B2 | 3/2009 | Criminisi et al. | |
| 7,551,771 B2 | 6/2009 | England | |
| 7,570,881 B2 | 8/2009 | Perala et al. | |
| 7,590,335 B2 | 9/2009 | Kobayashi et al. | |
| 7,590,992 B2 | 9/2009 | Koplar et al. | |
| 7,598,980 B2 | 10/2009 | Imai et al. | |
| 7,613,389 B2 | 11/2009 | Suzuki et al. | |
| 7,641,348 B2 | 1/2010 | Yin et al. | |
| 7,653,304 B2 | 1/2010 | Nozaki et al. | |
| 7,658,498 B2 | 2/2010 | Anson | |
| 7,834,846 B1 | 11/2010 | Bell | |
| 7,869,204 B2 | 1/2011 | Bair et al. | |
| 7,901,084 B2 | 3/2011 | Willey et al. | |
| 7,964,835 B2 | 6/2011 | Olsen et al. | |
| 8,044,880 B2 | 10/2011 | Nakamura et al. | |
| 2002/0021288 A1 | 2/2002 | Schug | |
| 2002/0095222 A1* | 7/2002 | Lignoul | 700/13 |
| 2003/0038927 A1 | 2/2003 | Alden | |
| 2003/0051181 A1* | 3/2003 | Magee et al. | 713/320 |
| 2003/0086013 A1 | 5/2003 | Aratani | |
| 2003/0117343 A1 | 6/2003 | King | |
| 2004/0193413 A1* | 9/2004 | Wilson et al. | 704/243 |
| 2005/0034147 A1* | 2/2005 | Best et al. | 725/10 |
| 2005/0132408 A1 | 6/2005 | Dahley et al. | |
| 2005/0168583 A1 | 8/2005 | Thomason | |
| 2005/0182962 A1* | 8/2005 | Given et al. | 713/200 |
| 2005/0243019 A1* | 11/2005 | Fuller et al. | 345/1.3 |
| 2005/0280786 A1 | 12/2005 | Moiroux et al. | |
| 2006/0140452 A1* | 6/2006 | Raynor et al. | 382/115 |
| 2006/0197843 A1 | 9/2006 | Yoshimatsu | |
| 2007/0027580 A1* | 2/2007 | Ligtenberg et al. | 700/300 |
| 2007/0069030 A1* | 3/2007 | Sauerwein et al. | 235/462.46 |
| 2007/0105072 A1* | 5/2007 | Koljonen | 434/112 |
| 2007/0177279 A1 | 8/2007 | Cho et al. | |
| 2007/0236485 A1 | 10/2007 | Trepte | |
| 2007/0300091 A1* | 12/2007 | Lee | 713/323 |
| 2007/0300312 A1* | 12/2007 | Chitsaz et al. | 726/34 |
| 2008/0062164 A1 | 3/2008 | Bassi et al. | |
| 2008/0131107 A1 | 6/2008 | Ueno | |
| 2008/0158362 A1 | 7/2008 | Butterworth | |
| 2008/0174427 A1* | 7/2008 | Banerjee et al. | 340/541 |
| 2008/0191864 A1 | 8/2008 | Wolfson | |
| 2009/0008683 A1 | 1/2009 | Nishizawa | |
| 2009/0027337 A1* | 1/2009 | Hildreth | 345/158 |
| 2009/0051797 A1 | 2/2009 | Yao | |
| 2009/0058842 A1* | 3/2009 | Bull et al. | 345/212 |
| 2009/0079765 A1* | 3/2009 | Hoover | 345/660 |
| 2009/0115915 A1 | 5/2009 | Steinberg et al. | |
| 2009/0150551 A1* | 6/2009 | Pagan | 709/228 |
| 2009/0221368 A1* | 9/2009 | Yen et al. | 463/32 |
| 2009/0262306 A1 | 10/2009 | Quinn et al. | |
| 2009/0262343 A1 | 10/2009 | Archibald | |
| 2009/0273679 A1 | 11/2009 | Gere et al. | |
| 2009/0296997 A1* | 12/2009 | Rocheford | 382/124 |
| 2009/0309826 A1 | 12/2009 | Jung et al. | |
| 2010/0060803 A1 | 3/2010 | Slack et al. | |
| 2010/0061659 A1 | 3/2010 | Slack et al. | |
| 2010/0073499 A1 | 3/2010 | Gere et al. | |
| 2010/0079426 A1 | 4/2010 | Pance et al. | |
| 2010/0079468 A1 | 4/2010 | Pance et al. | |
| 2010/0079653 A1 | 4/2010 | Pance | |
| 2010/0079884 A1 | 4/2010 | Gere et al. | |
| 2010/0103172 A1 | 4/2010 | Purdy | |
| 2011/0074931 A1 | 3/2011 | Bilbrey et al. | |
| 2011/0075055 A1 | 3/2011 | Bilbrey | |
| 2011/0115964 A1 | 5/2011 | Gere | |
| 2011/0149094 A1 | 6/2011 | Chen et al. | |
| 2012/0044328 A1 | 2/2012 | Gere | |
| 2012/0076363 A1 | 3/2012 | Kessler et al. | |

FOREIGN PATENT DOCUMENTS

| | | |
|---|---|---|
| JP | 2002354493 | 12/2002 |
| WO | WO93/11631 | 6/1993 |
| WO | WO2007/100057 | 9/2007 |
| WO | WO2009/001512 | 12/2008 |

OTHER PUBLICATIONS

Koschan et al., "Finding Objects in a 3D Environment by Combining Distance Measurement and Color Indexing," IEEE, vol. 1, pp. 858-861, Oct. 2001.

Sokolova et al., "Experiments in Stereo Vision," Computer Science 570, Final Project, http://disparity.wikidot.com/, 14 pages, at least as early as Jun. 16, 2010.

* cited by examiner

COMPUTER USER INTERFACE SYSTEM AND METHODS

TECHNICAL FIELD

This invention relates generally to computer user interface systems and methods, and more specifically to computer user interface systems and methods employing distance, depth and/or proximity sensors.

BACKGROUND

A wide variety of computer devices are known, including, but not limited to, personal computers, laptop computers, personal digital assistants (PDAs), and the like. Such computer devices are typically configured with a user interface that allows a user to input information, such as commands, data, control signals, and the like, via user interface devices, such as a keyboard, a mouse, a trackball, a stylus, a touch screen, and the like.

Other devices, such as kiosks, automated teller machines (ATMs), and the like, may include a processor or otherwise be interfaced with a processor. Accordingly, such devices may essentially include a computer and thus may include a similar user interface as employed for computer systems.

SUMMARY

Various embodiments described herein are directed to computer user interface systems and methods that provide user input to a computer based on data obtained from at least one distance, depth and/or proximity sensor associated with the computer. In particular, various embodiments involve a plurality of distance, depth and/or proximity sensors associated with the computer.

Various embodiments contemplate a computer user interface systems that allow a computer to be controlled or otherwise alter its operation based on information detected by such sensors. In some embodiment, an operating system of the computer may be controlled based on such information. Alternatively or additionally, an active application may be controlled based on such information.

In particular, the information detected by such sensors may define various user contexts. In other words, the sensor(s) may detect a user parameter relative to the computer such that different user contexts may be determined. For example, a user presence context may be determined to be presence of a user, absence of a user or presence of multiple users within a vicinity of the computer. Based on the determined user presence context, the computer may be placed in a particular mode of operation and/or may alter an appearance of information displayed by the computer.

Various other user contexts may be determined based on information or user parameters detected by one or more sensors. A user proximity context may be determined, for example, in terms of a location of a user relative to the computer or a distance of a user from the computer. In such embodiments, an appearance of information displayed by the computer may be altered or otherwise controlled based on the user proximity context. For example, a size and/or a content of the information displayed by the computer may be altered or controlled.

Also, in some embodiments, a user gesture context may be determined based on information or user parameters detected by one or more sensors. In such embodiments, one or more operations of the computer may be performed based on the determined user gesture context. For example, such operations may include, but are not limited to, scrolling, selecting, zooming, or the like. In various embodiments, such operations may be applied to an active application of the computer. In general, user gesture contexts may be employed to allow a user to operate the computer remotely via the one or more sensors, without a remote controller or other auxiliary user manipulated input device.

Thus, various embodiments contemplate a sensor-based computer user interface system. Other embodiments contemplate a method user interaction with a computer system via one or more sensors. Still further embodiments contemplate a computer readable storage medium including stored instructions that, when executed by a computer, cause the computer to perform any of the various methods described herein and/or any of the functions of the systems disclosed herein.

These and other embodiments and features will be apparent to those of ordinary skill in the art upon reading this disclosure in its entirety, along with the appended claims.

DETAILED DESCRIPTION OF THE INVENTION

Figure 1:
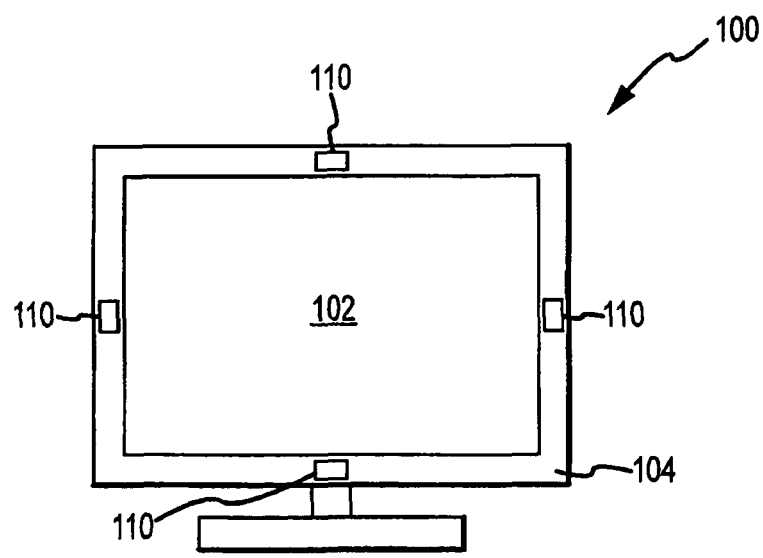
FIG. 1 is a schematic representation of a monitor of a computer system including a sensor-based user interface.

Computer systems and methods disclosed herein may provide an entirely new category of user interface systems as compared to conventional user interfaces. Various embodiments contemplate using one or more sensors as a means for a user to interact with a computer system, either separately or in conjunction with conventional peripheral user input devices, such as mice, keyboards, and the like.

In some embodiments, such an approach may allow a user to interact with a computer remotely, that is, at a distance outside of physical reach, without using a remote controller or other user manipulated input device. In some embodiments, such an approach may allow a computer system to automatically perform various operations in response to changes in user contexts.

As used herein, a user context should be understood as defining how a user relates to a computer system in terms of relative location, distance or proximity, presence or absence, and/or movements or gestures. A user context should be understood as defining such relationships to the computer for multi-user settings as well. It should also be understood that additional information may form part of the user context, including but not limited to, information regarding the activity of the user, the identity of the user, the time and/or date, the location of the computer system, the environment of the computer system/user(s), active application(s), operating system variables, and the like. In other words, any relevant information available to the computer system regarding the user(s) and his environment that affects the user's(s') interaction with the computer system may be included, as appropriate or desired, to define one or more user contexts. As described herein, sensor data may provide certain information regarding the user(s), while other information may be provided by other aspects of the computer system, such as user account settings and/or preferences, open applications and/or windows, current/active application, application history, time, date, location, IP address, and the like.

As used herein, a user parameter should be understood as including any detectable parameter associated with a user. This may include a user's physical being, for example, based on which presence, depth, distance, proximity, movements, gestures, and the like may be detected. In some cases, this may also include objects that a user may carry or keep on his person, for example, based on which presence, depth, distance, proximity and/or changes in such values may be detected. For example, a user's wireless communication device (e.g., cell phone, electronic identification card or tag, and the like) may be detected, for example, via wireless communication protocols, such as Bluetooth® or RFID (radio frequency identification).

The systems and methods described herein may provide a sensor-based user interface and/or ways for a user to interact with a computer system via one or more sensors. The sensor or sensors may be of any suitable type, either currently known or hereafter developed, that is configured to detect one or more of depth, distance, proximity, presence, or the like. For example, approaches such as near field radio frequency (RF), ultrasonic, infrared (IR), antenna diversity, or the like may be employed. This lists is not intended to be exhaustive, and it should be understood that other sensors may be employed as well, including, but again not limited to, visible light sensors, ambient light sensors, mechanical vibration sensors. It should be understood that the term sensors as used herein is intended to include systems of emitters and sensors, for example, where the emitters "paint" a field of interest and the sensors detect resulting reflections of objects within the field. It should also be understood that the number of sensors as well as the type, the sensitivity, the range, the field of detection (angle of incidence), and the like, may be determined, for example, on the user interaction to be detected and/or the computer system control/response to be implemented. Further, it should be understood that the sensors contemplated herein are relatively "simple" sensors that do not generally require intensive data processing and may provide suitable "reaction time" to changing parameters that indicate changes in user contexts. This does not mean that more complex, processing-intensive systems may not be employed, but rather that such more complex systems may be invoked based on the relatively simple and reactive sensor systems contemplated herein.

In some embodiments, a plurality of sensors may be employed. Based on a known distribution of sensors, such as a linear or two-dimensional array of sensors, various algorithms may be employed to calculate relative states of the sensors and/or changes in the states of the sensors and to map or interpret the states/changes to determine user contexts and/or changes in user contexts. In general, sensor systems employing digital signal processing techniques and state machine logic may be employed to implement the various features described herein.

For gesture extraction, it should be understood that the sensor system and/or context engine may be calibrated and trained to learn a specific set of gestures, for example, from a specific user. Such a process may be adaptive, for example, beginning with a relatively small set of gestures that are more readily detectable or recognizable/distinguishable, and building a user-dependent gesture database with more complex gestures through training and/or use.

Gestures may have time and/or sequence dependence, for example, such that a specific sequence of detected user movements may be interpreted as a gesture. Gestures may also be distance dependent, for example, such that gestures include a distance component. In general, it should be understood that the gesture contexts may be dependent on other user contexts, as discussed herein. The user contexts and changes in user contexts, whether gesture contexts or not, may have corresponding control instructions or commands that are provided to the computer system to effect user control and/or interaction with the computer system.

In some embodiments, the sensor(s) may be configured to measure values. Alternatively or additionally, the sensor(s) may be employed in a binary manner, either on or off. In general, the sensors contemplated herein may measure analog values that may be converted to digital signals and processed by a digital signal processor (DSP), which may be implemented in hardware and/or software. The processed digital signals may be provided to threshold detection logic, for example, to generate binary information about the user context (such as user present or absent), may be provided to multi-threshold logic, for example, to determine information having more than two states (such as, user near/intermediate/far or user left/center/right) and/or may be used as a digital measure (such as user distance or relative location).

As will be further understood from the following description, the user contexts that may be determined based on detected user parameter(s) may include, for example, a user presence context, a user proximity context and a user gesture context. While these contexts are described separately, it should be understood that one or more of such contexts may be combined to define a user context of interest. As discussed above, other information may form part of the user context(s) as well.

In the sensor-based computer user interface systems and methods described herein, the control of and/or response by the computer system may be at an operating system level or at an application level. For example, on the operating system level, the operating system may increase screen brightness if the user is determined to be far from the computer display. The operating system may transfer control of a displayed pointer from a mouse, for example, when the user is near, to gesture detection, for example, when the user is far. In some embodiments, an active application may be controlled or otherwise respond to the information detected by the sensor(s).

Turning now to particular embodiments that provide examples of how sensor-based computer user interface systems and methods may be implemented, a schematic representation of a monitor 100 of a computer system including a sensor-based user interface is shown in FIG. 1. The monitor 100 may include a screen 102 that is surrounded by a frame 104.

The frame 104 of the monitor 100 may provide a suitable location for sensors 110. As a user or users may typically be positioned in a manner to view the screen 102, the sensors 110 may be mounted to the frame 104 or otherwise incorporated into the monitor 100 in a manner that will be effective for detecting the user(s) and/or user parameters.

Although the sensors 110 are shown as being located at top, bottom, left and right positions, it should be understood that other arrangements are possible and may be suitable for a given application. For example, an arrangement of a plurality of sensors 110 may be suitable for detecting user parameters and/or changes in three dimensions. Also, it should be understood that a single sensor 110 may be employed for some applications. For example, a single proximity sensor may be employed to detect user presence/absence and/or user near/far.

Figure 2:
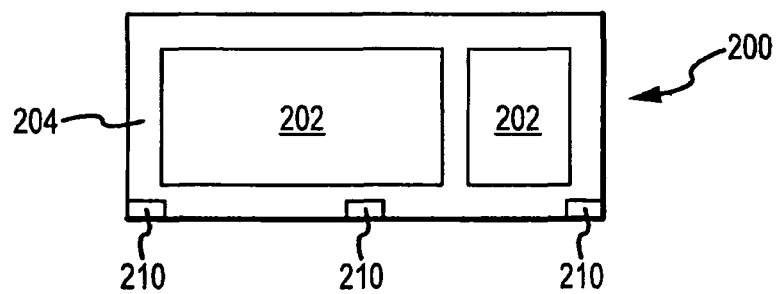
FIG. 2 is a schematic representation of a keyboard of a computer system including a sensor-based user interface.

FIG. 2 is a schematic representation of a keyboard 200 of a computer system including a sensor-based user interface. The keyboard 200 may include keys 202 that are disposed within a frame 204. The frame 204 of the keyboard 200 may provide a suitable location for sensors 210. As a user or users may typically be positioned in a manner to use the keyboard 200, the sensors 210 may be mounted to the frame 204 or otherwise incorporated into the keyboard 200 in a manner that will be effective for detecting the user(s) and/or user parameters.

It should be understood that the sensor arrangement illustrated in FIG. 2 may be employed in addition, or as an alternative, to the sensor arrangement illustrated in FIG. 1. Further, it should be understood that other sensor arrangements may be employed.

In general, the sensor(s) need only be configured to detect a user parameter and/or changes in a user parameter. For example, sensors that are not attached or incorporated into a structure of the computer system may be employed. For example, it may be sufficient to place the sensor(s) at a desired location of use to allow a user to control and/or interact with the computer system from the desired location. In some embodiments in which the sensor or sensors is/are not attached or incorporated into a structure of the computer system, a mechanism may be provided to detect or determine a location of the sensor(s) relative to the computer system or a part thereof. In other words, wired or wireless communication between the sensors and the rest of the system would be needed and, at least for some user contexts, the relative location(s) of the sensor(s) to the computer system and/or each other may be needed.

Figure 3:
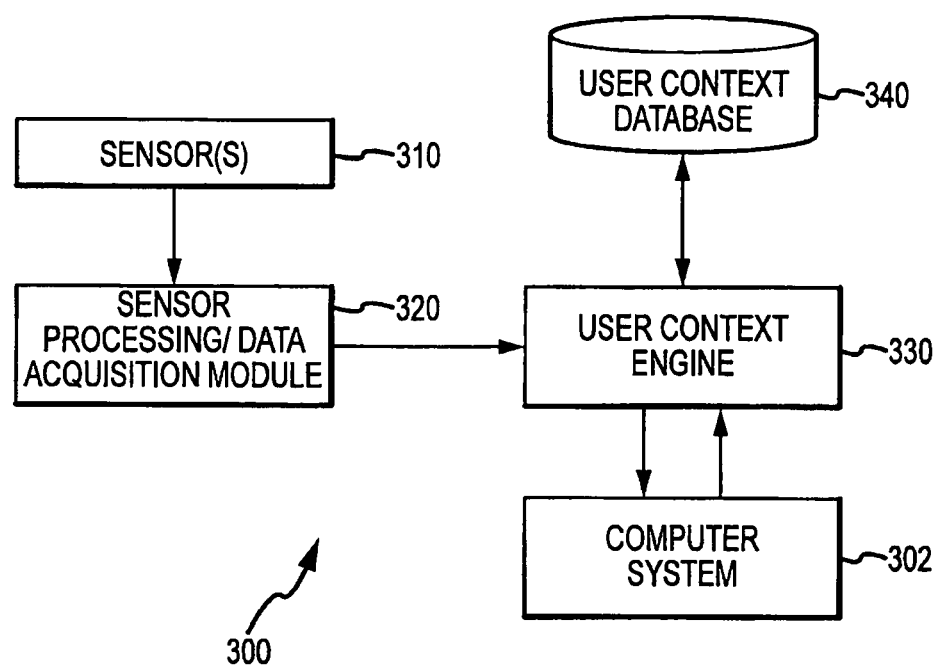
FIG. 3 is a schematic block diagram illustrating an example of a sensor-based user interface for a computer system.

FIG. 3 is a schematic block diagram illustrating an example of a sensor-based user interface system 300 for a computer system 302. As shown, the computer system 302 may be considered to form part of the sensor-based user interface 300 in some embodiments. For example, a processor of the computer system 302 may be employed to control operations of the various components of the sensor-based user interface system 300. However, it should be understood that the sensor-based user interface system 300 may be defined separately from the computer system 302 with which it is configured to interact, for example, by including a separate processor. As such, it should be understood that the block diagram of FIG. 3 is intended only to be illustrative. Also, it should be understood that details of the computer system 302 not specifically discussed herein may be implemented in any suitable manner, such as conventional and well known in the art.

Figure 4:
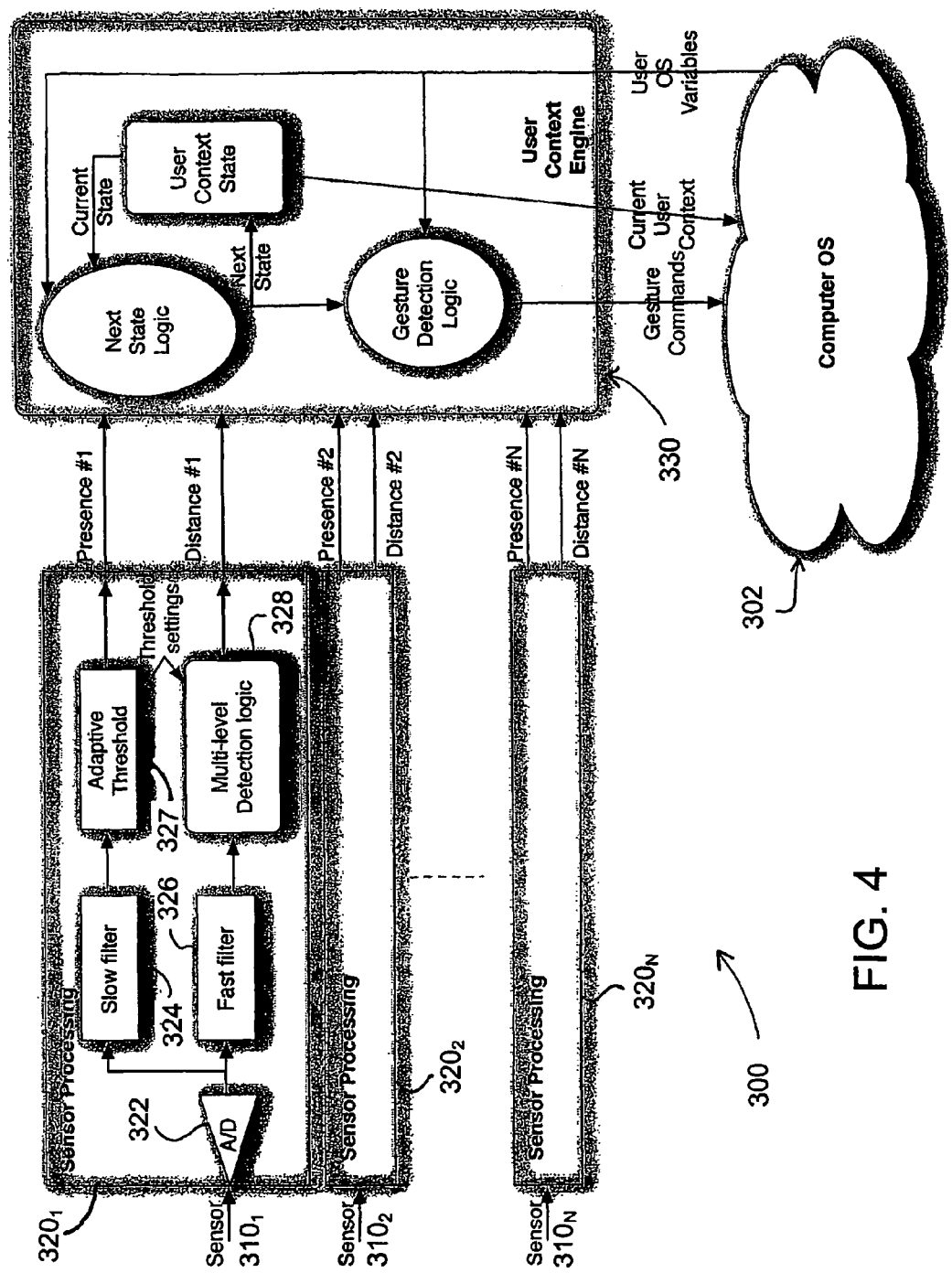
FIG. 4 is a block diagram illustrating a more detailed example of the sensor-based user interface system shown in FIG. 3.

As discussed above, the sensor-based user interface system 300 may include one or more sensors 310. Operation of the sensors 310 may be supported by a sensor processing or data acquisition module 320. The sensor processing/data acquisition module 320 may be implemented as software and/or hardware, as appropriate or desired. For example, the sensor processing/data acquisition module 320 may include analog to digital conversion, digital signal processing (such as filtering, thresholds, and the like), such as illustrated in FIG. 4, discussed below.

Data or information acquired and/or processed from the sensor(s) 310 by the sensor processing/data acquisition module 320 may be provided to a user context engine 330. The user context engine 330 may be implemented as software and/or hardware, as appropriate or desired. For example, the user context engine 330 may be implemented as a state machine with various levels of complexity, may be based on or incorporate neural networks, fuzzy logic, statistical model building and reasoning based on Bayesian classifications, or the like. In general, the user context engine 330 may be configured to interpret the information from the sensor(s) 310 to determine a corresponding user context and/or changes in the user context.

In particular, the user context engine 330 may employ one or more algorithms to determine user contexts and/or changes in user contexts. The user context engine 330 may access a user context database 340 to determine whether the result(s) of the algorithm(s) correspond to defined user contexts and/or changes in user contexts. Once a user context or change in user context is determined, the user context engine 330 may access a corresponding control instruction, for example, stored in the user context database 340, and provide the corresponding control instruction to the computer system 302 to effect a desired control of and/or response by the computer system 302.

Alternatively, the user context engine 330 may provide the determined user context and/or change in user context to the computer system 302, which may be configured to implement a corresponding control instruction. For example, the computer system 302 may be configured to map user contexts and/or changes in user contexts to corresponding control instructions.

In addition to the information provided by the sensor processing/data acquisition module 320, the user context engine 330 may be configured to receive information from the computer system 302 regarding its operating state. For example, information regarding the particular operational state of, a particular active application on, and/or particular information for display by the computer system 302 may be used by the user context engine 330 to interpret the information received from the sensor(s) to determine the user contexts and/or the changes in user contexts and/or to map the user contexts and/or the changes in user contexts to a particular set of control instructions.

The user context engine 330 may also be configured to "learn" or to be "trained" to recognize various user contexts and/or changes in user contexts, for example, by executing a training algorithm with a user providing various inputs via the sensor(s) 310. In such a manner, the user context database 340 may be populated or "educated." As appropriate or desired, the user context database 340 may be populated for specific users so that the sensor-based user interface is tailored, for example, to the characteristics and/or mannerisms of the particular user to better define the user parameters to be detected by the sensor(s) 310. Any suitable learning approach may be employed, particularly adaptive learning approaches. In general, the approach should allow the system to be calibrated to decrease and/or minimize false detection and increase and/or maximize positive recognition of gestures.

FIG. 4 is a block diagram illustrating a more detailed example of the sensor-based user interface system 300 for the computer system 302 shown in FIG. 3. In FIG. 4, the computer 302 is represented by the operating system (OS), but it should be understood that one or more applications and/or hardware may be employed to interact with the sensor-based user interface system 300. The operating system of the computer 302 may be employed to control operations of the various components of the sensor-based user interface system 300. However, this should not be considered to exclude the possibility of the various components of the sensor-based user interface system 300 including one or more separate processors, as appropriate or desired, which may operate independently or at the direction of the computer 302.

As discussed above, the sensor-based user interface system 300 may include a plurality of sensors $310_1, 310_2 \ldots 310_N$. As illustrated in FIG. 4, the sensors $310_1, 310_2 \ldots 310_N$ may each represent one or more sensors of a particular type (such as configured to detect a particular user parameter) or of an associated set of sensors designed to cooperate in some manner. As such, each of the sensors $310_1, 310_2 \ldots 320_N$ may communicate with a respective sensor processing module $320_1, 320_2 \ldots 320_N$. Alternatively, as appropriate or desired, a single sensor processing module may be employed for multiple ones or all of the sensors $310_1, 310_2 \ldots 310_N$. Thus, it should be understood that separate sensor processing modules and/or circuitry of a shared processing module may be tailored to the particular sensor(s) communicating therewith.

For example, the sensors $310_1, 310_2 \ldots 310_N$ may be analog sensors such that the respective sensor processing modules $320_1, 320_2 \ldots 320_N$ include an analog-to-digital (A/D) converter 322. Of course, if the corresponding sensor provides data in digital form. Digital data from the analog-to-digital converter 322 may be provided to either a slow filter 324 or a fast filter 326, depending on reaction time, sensitivity or the like desired for the particular user parameter and/or user context of concern. As discussed above, various approaches to threshold settings may be employed, again as appropriate or desired for the particular user parameter and/or user context of concern. For example, an adaptive threshold circuit or module 327 and/or a multi-level detection logic circuit or module 328 may be employed.

Processed sensor information, such as presence, distance, and the like, as discussed herein, may be provided from the sensor processing modules $320_1, 320_2 \ldots 320_N$ to the user context engine 330. As discussed above, the user context engine 330 may employ a state machine, illustrated by the user context state module 332a, the next state logic 332b and the data flow lines, including current state and user operating system variables, for example, as input to the next state logic 322b to determine the updating of the user state context 322a to the next state based on the processed sensor information provided.

Also, the user context engine 330 may include gesture detection logic 324 that may implement interpretation of the processed sensor information to determine whether such information corresponds to various gesture commands, for example, stored in a database of gesture commands as discussed above. The gesture detection logic 324 may base its interpretation of the processed sensor information based on changes in user context state and/or other information, such as user OS variables as shown, provided from the computer system 302.

As will be understood from the foregoing, various methods may be envisioned for user interaction with a computer system via a sensor-based user interface. As such, the following description of methods should be understood to be for the sake of illustration, and not limiting.

Figure 5:
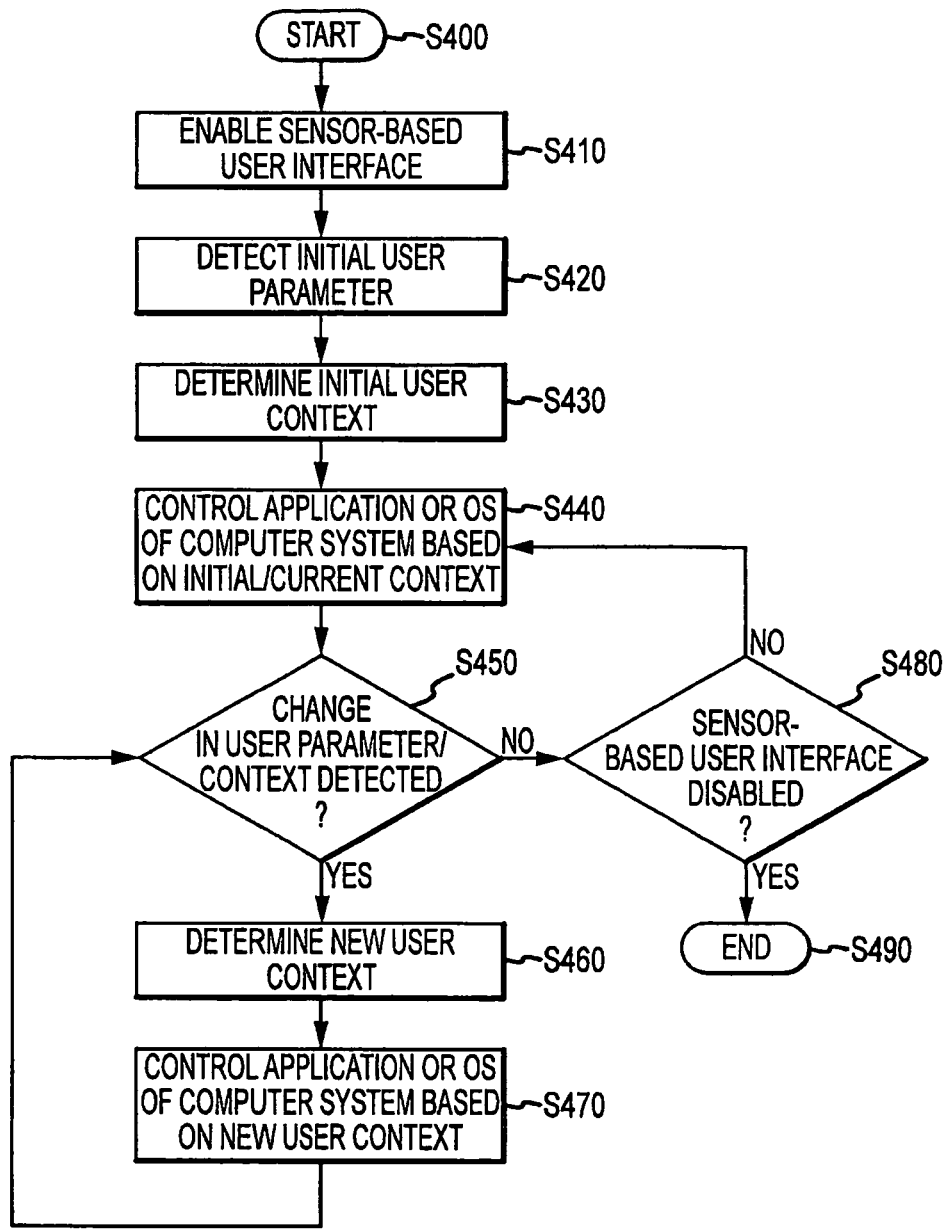
FIG. 5 is a flowchart illustrating an example of a method of user interaction with a computer system via one or more sensors.

FIG. 5 is a flowchart illustrating one example of a method of user interaction with a computer system via one or more sensors. Control may begin at S400, and may proceed to S410 where the sensor-based user interface is enabled. As discussed above, it should be understood that the sensor-based user interface may be used in conjunction with conventional user interface devices. Thus, enabling of the sensor-based user interface may be via a mouse, a keyboard, or the like, or may be automatic upon startup of the computer system, its operating system, a dedicated application and/or an application that is compatible with the sensor-based user interface.

In S420, an initial user parameter may be detected. As discussed above, the detected user parameter may be the user's body or a part thereof, or an object associated with the user. Based on the detected initial user parameter, an initial user context may be determined AT s430. For example, a user presence context may be determined to be that a user or a specific user is present in a certain vicinity of the computer system.

Based on the determined initial user context, an operating system and/or an active application of the computer system may be controlled at S440. For example, when the user presence context is that a user is in the vicinity of the computer system, the computer system may be placed in a use mode—that is, an operational mode in which the computer is running normally.

At S450, a determination may be made as to whether or not a change in the user parameter or user context is detected by the sensor(s). This may involve evaluating information received from the sensor(s) to determine if state(s) of the sensor(s) has/have changed and/or whether such change corresponds to a change in the user context. For example, a user may change location relative to the computer system, which may change the user parameter. However, the change in the user parameter may or may not be sufficient to cause a change in the user context. However, the user may change his location relative to the computer significantly enough to result in a change in the user context.

If so, a new user context may be determined at S460. For example, the user may have changed his location relative to the computer system so as to no longer be within the certain vicinity of the computer system. Based on the new user context, the operating system and/or the active application of the computer system may be controlled at S470. For example, when the new user presence context is that a user is not in the certain vicinity of the computer system, the computer system may be placed in a non-use mode—that is, an operational mode in which the computer is running less active, such as a sleep mode or a hibernate mode. Alternatively, the computer system may automatically logout the user so that another person cannot access the computer via that user's login.

It should be understood that such actions by the computer system may be implemented only after a predetermined period of time has elapsed after the change in user parameter is detected and/or the change in user context is determined, as appropriate or desired. For example, a user may be allowed to leave the certain vicinity for a certain amount of time without being logged out or having the computer enter a non-use mode.

Control may return to S450 for detection of a further change in user parameter and/or user context. If no change is detected, for example, within a predetermined amount of time, control may continue to S480 where a determination may be made as to whether the sensor-based user interface is disabled. If not, control may return to S440 to continue control of the computer system based on the current context. If so, control may proceed to S490 and end. It should be understood, however, that ending the sensor-based user interface operation may be implemented at any time, for example, based on other user input.

While the flowchart in FIG. 5 is described above in terms of determining a user presence context, it should be understood that other user contexts mat be determined as well. For example, a user proximity context may be determined. This may be similar to the user presence context described above, having a certain proximity of the user to the computer system defining different user proximity contexts, such as near and far. Alternatively, user proximity contexts may be defined for various discrete distances of the user from the computer system, or even substantially continuously varying based on measured distance, as appropriate or desired.

Figure 6A:
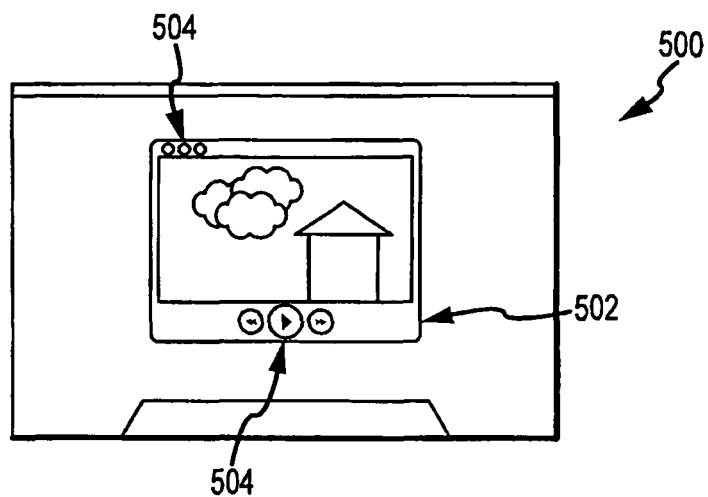
FIGS. 6A and 6B are schematic representations of information that may be displayed based on the method of user interaction illustrated in the flowchart of FIG. 5.
Figure 6B:
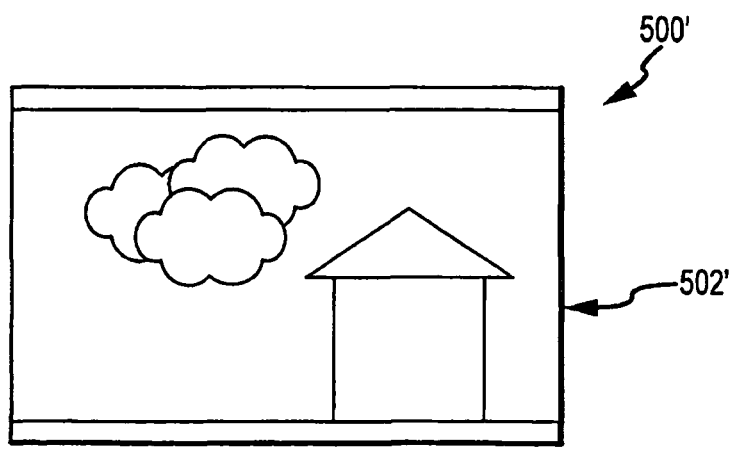

One example of how a computer system may respond or be controlled based on a change in a user proximity context is illustrated by FIGS. 6A and 6B. FIG. 6A shows a computer display 500 including relatively dense visual media 502 with various icons 504 for user interaction, for example, via a mouse (not shown). The computer display of FIG. 6A may be provided by the computer system when the user proximity context is that the user is relatively near the computer system (or the monitor thereof, for example).

When the user proximity context changes by the user moving to a location relatively far from the computer system (or the monitor thereof, for example), the relatively dense visual media 502 may be filtered and/or enlarged to provide information that is usable/viewable from the increased distance. As shown in FIG. 6B, for example, such a change in user proximity context may result in a computer display 500' including filtered visual media 502', which is an enlarged portion of the relatively dense visual media 502 shown in FIG. 6A. The icons 504 shown in the display 500 of FIG. 6A may not be included, for example, because the user may not be within reach of the mouse or other input device for using such icons 504 in the changed user proximity context. In some embodiments, control of the computer system may be transferred between the mouse or other input device and enabled gesture control.

Figure 7A:
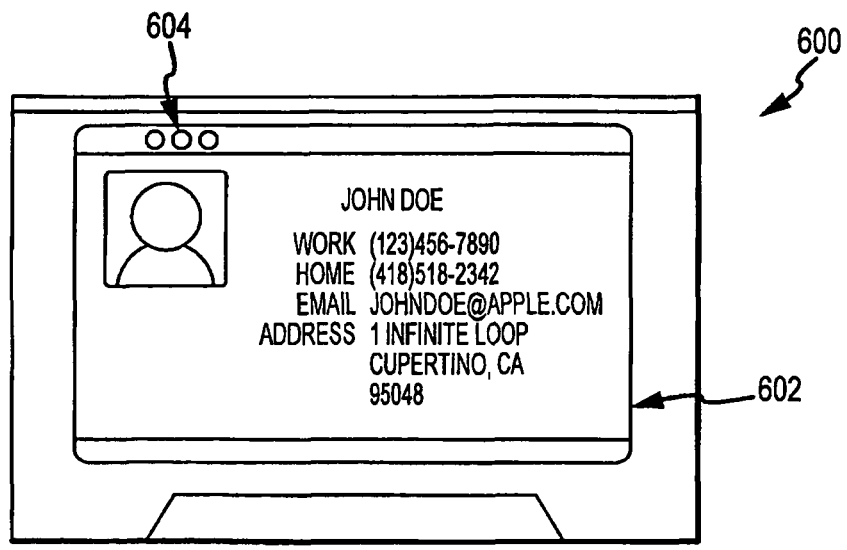
FIGS. 7A and 7B are schematic representations of other information that may be displayed based on the method of user interaction illustrated in the flowchart of FIG. 5.
Figure 7B:
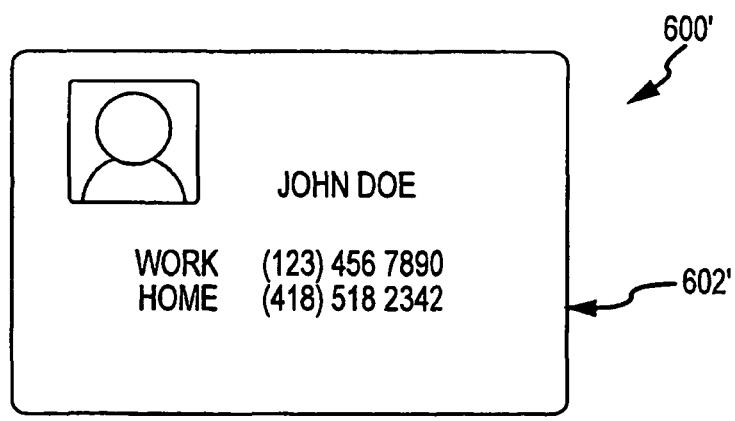
Figure 8:
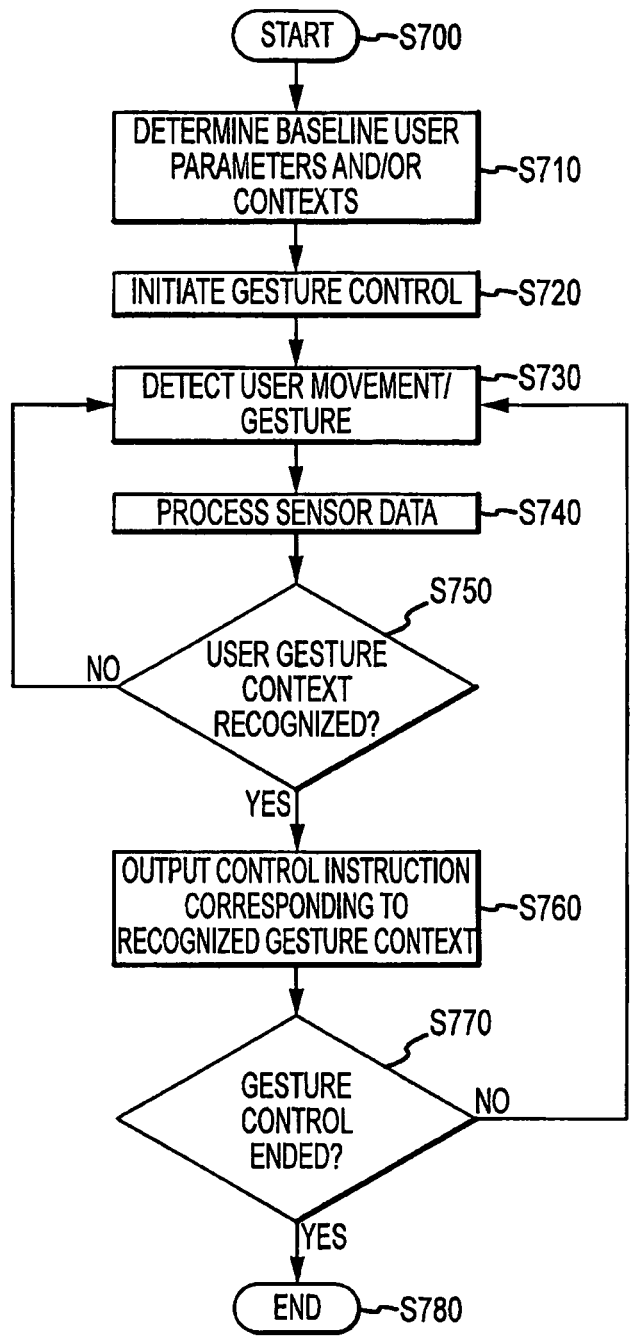
FIG. 8 is a flowchart illustrating another example of a method of user interaction with a computer system via one or more sensors.

Another example of how a computer system may respond or be controlled based on a change in a user proximity context is illustrated by FIGS. 7A and 7B. FIG. 7A shows a computer display 600 including relatively dense information 602 with various icons 604 for user interaction, for example, via a mouse (not shown). The computer display of FIG. 7A may be provided by the computer system when the user proximity context is that the user is relatively near the computer system (or the monitor thereof, for example).

When the user proximity context changes by the user moving to a location relatively far from the computer system (or the monitor thereof, for example), the relatively dense information 602 may be filtered and/or enlarged to provide information that is usable/viewable from the increased distance. As shown in FIG. 7B, for example, such a change in user proximity context may result in a computer display 600' including filtered information 602', which is an enlarged portion of the relatively dense information 602 shown in FIG. 7A. The icons 604 and some of the information 602 shown in the display 600 of FIG. 7A may not be included, again, because the user may be at a location where the user can use such icons 604 or information 602. Further, the appearance may be altered, in addition to or instead of enlarging, for example, by changing information/background to enhance uasability/viewability from the increased distance.

Other features of the display or the computer system may be controlled or otherwise may respond to changes in user proximity contexts and/or user presence contexts. For example, screen brightness may be controlled based on such user contexts to automatically adjust for changing viewing conditions for the user.

Also, for example, content may be hidden/viewable and/or available or active applications may be enabled/disabled based upon user presence contexts. Private or sensitive information may only be viewable when the user presence context is that a single user is present, defining a private user presence context. Such information may be automatically hidden, for example, when a change in the user presence context is determined by detecting the presence of another person in a vicinity of the computer system (or the monitor thereof, for example). Closing or hiding windows based on such a change in user presence context to a public user context may present the private or sensitive information from being viewed by others, even if the user is unaware of the other person's presence or forgets that the information is viewable, private or sensitive.

In general, it should be understood that any desired feature of a computer system may be controlled or enabled to automatically respond to changes in user contexts using a sensor-based user interface as described herein. Thus, the foregoing descriptions should be understood to be illustrative, and not exhaustive.

In particular, as discussed above, the sensor-based user interface systems and methods described herein may allow a user to control and/or to interact with a computer system remotely, without the use of a user manipulatable input device or remote controller. In some embodiments, the sensor-based user interface systems and methods may be configured to detect a variety of user movements and/or gestures to determine various user gesture contexts. The various determined user gesture contexts may have corresponding control instructions for the computer system to cause the computer system to perform various operations, which may depend, for example, on an application that is active on the computer system.

The user gesture contexts that are determined based on the detected movements and/ort gestures of the user may define an entire set of "multi-touch" display gestures, that is, a set of gestures analogous to the multi-touch gestures developed in other technologies. For example, gestures analogous to those disclosed in the following U.S. patents and published U.S. patent applications may be employed, as appropriate or desired, with the computer user interface systems and methods described herein: U.S. Pat. Nos. 6,323,846, 6,570,557, 6,888,536, 7,030,861, 7,339,580 and RE40,153; and U.S. patent publications nos. 2006/0026521, 2006/0026535, 2006/0026536, 2007/0257890, 2008/0036743, 2008/0158167, 2008/0158168, 2008/0158172, 2008/0204426, 2008/0211775, 2008/0211783, 2008/0211784 and 2008/0211785. For example, movement of the user's hand left-to-right, right-to-left, up-to-down, and down-to-up may effect a respective scrolling control. Movement of a user's hand from far-to-close may effect a selecting control. Movement of the user's hands from left and right-to-middle or from up and down-to-middle may effect a zooming control. The opposite directional gesture may zoom out.

A simple example of pseudo-code for a "scroll left-to-right gesture" may be as follows. A user interface system including three distance/depth sensors disposed on a computer monitor, for example, a left sensor (LS), a middle sensor (MS) and a right sensor (RS), may be configured to detect a user at distances up to a couple feet, for example, with an angular directionality of less than five degrees. The sensor processing of the system may be configured to produce a distance function DISTANCE with values of NEAR, MIDRANGE and FAR from a set of distance measurements d and a presence function PRESENCE with values of YES and NO.

```
    At any discrete time sampling point t = K:
USER_PRESENT (K) = if PRESENCE (LS, K) or PRESENCE (RS, K) or
PRESENCE (MS, K)
d (USER, K) = weighted_average (d (LS), d (MS), d (RS)) at time t = K
DISTANCE (S, K) = F (d(S), K), where F is a trinity function and S is LS, MS or RS
USER_DISTANCE (K) = DISTANCE (d (USER, K))
if USER_PRESENT (K)
then
if
AND (
DISTANCE (LS, K-3) = MIDRANGE and DISTANCE (LS, K-2) = MIDRANGE,
PRESENCE (MS, K-3) = NO and PRESENCE (MS, K-2) = NO,
PRESENCE (RS, K-3) = NO and PRESENCE (RS, K-2) = NO,
)
and
AND (
PRESENCE (LS, K-1) = NO,
PRESENCE (MS, K-1) = YES and DISTANCE (MS, K-1) = MIDRANGE,
PRESENCE (RS, K-1) = NO
)
and
AND (
PRESENCE (LS, K) = NO,
PRESENCE (MS, K) = NO and DISTANCE (MS, K-1) = MIDRANGE,
PRESENCE (RS, K) = YES and DISTANCE (RS, K) = MIDRANGE
)
then
GESTURE = SCROLL_LEFT_TO_RIGHT
endif
endif
```

The control instructions provided to the computer system for each of the user gesture contexts may be applied to an active (e.g., topmost) application, or to an entire desktop view, as appropriate or desired.

One example of a method of user interaction with a computer system via a sensor-based user interface system is illustrated in FIG. 7. In the illustrated example, control may begin at S700 and continue to S710, where a baseline for user parameters and/or user contexts may be determined. For example, as discussed above, the sensor-based user interface system may be trained to recognize a particular user's movements. This may be done, for example, by having the user complete a series of movements corresponding to specific user contexts so that the sensor-based user interface system may recognize such movements by the user as intended to be the corresponding user context.

It should be understood that the operations of S710 are optional and need not be included, for example, where the user gesture contexts are relatively simple and/or limited. Also, once the sensor-based user interface system has been "trained" for a particular user, the sensor-based user interface system may operate without such operations being performed, for example, with only a user identification operation that accesses user gesture context information stored based on the training. Alternatively or additionally, the "training" of the sensor-based user interface system may be performed and/or continue during its normal use.

Normal use may be defined by S720 through S780 illustrated in FIG. 7, for example. As S720, gesture control may be initiated. This may occur automatically, for example, after training is complete or upon startup of the sensor-based user interface system. Alternatively, this may be based on a conventional user input, for example, where the sensor-based user interface system includes different modes of operation, for example, for determining different user contexts and/or using different sensors.

Next, at S730, a user movement or gesture (user parameter) may be detected by the one or more sensors of the sensor-based user interface system. The data or information from the sensor(s) may be processed at S740, such as described above. Based on the processing, a determination may be made at S750 as to whether a user gesture context is recognized. If not, control may return to S730 to continue to detect user movements or gestures.

If a user gesture context is recognized at S750, control may proceed to S760 where a control instruction corresponding to the recognized gesture context may be obtained and output to the computer system. Thus, the computer system may implement an operation based on the control instruction corresponding to the recognized gesture context.

Next, at S770, a determination may be made as to whether gesture control has been ended. If not, control may return to S730 to continue to detect user movements or gestures. If so, control may proceed to S780 and end. In some embodiments, a gesture context may have a corresponding control instruction that end gesture control. However, it should be understood that gesture control may be ended in any appropriate or desired manner.

The foregoing merely illustrates certain principles of the invention. Various modifications and alterations to the described embodiments will be apparent to those skilled in the art in view of the teachings herein. It will thus be appreciated that those skilled in the art will be able to devise numerous systems, arrangements and methods which, although not explicitly shown or described herein, embody the principles disclosed in this document and are thus within the spirit and scope of the present invention. From the above description and drawings, it will be understood by those of ordinary skill in the art that the particular embodiments shown and described are for purposes of illustration only and are not intended to limit the scope of the present invention. References to details of particular embodiments are not intended to limit the scope of the invention.

The invention claimed is:

1. A computer user interface system, comprising:
a computer including a processor;

at least one sensor coupled to the processor and configured to detect a user parameter relative to the computer, wherein the processor is configured to determine a user context based on the detected user parameter and a user presence context based on the detected user parameter;

wherein when the user presence context indicates absence of a user from a vicinity of the computer, the processor places the computer in a non-use mode, wherein the non-use mode comprises at least one of a sleep mode, a hibernate mode, or a user logged out mode;

wherein the processor is configured to determine a user proximity context based on the detected user parameter; and wherein the processor is configured to alter an appearance of information displayed by the computer based on the determined user proximity context.

2. The system of claim 1, wherein the at least one sensor is configured to detect at least one of depth, distance, proximity and presence of a user relative to the computer as the user parameter.

3. The system of claim 1, wherein the processor is configured to control an operating system of the computer based on the determined user context.

4. The system of claim 1, wherein the processor is configured to control an active application of the computer based on the determined user context.

5. The system of claim 1, wherein when the determined user presence context is presence of a user in a vicinity of the computer, the processor places the computer in a use mode.

6. The system of claim 1, wherein the processor is configured to alter a size of the information displayed by the computer based on the determined user proximity context.

7. The system of claim 6, wherein the processor is configured to alter a relative size of the information displayed by the computer based on a relative value of the determined user proximity context.

8. The system of claim 1, wherein the processor is configured to determine a user gesture context based on the detected user parameter.

9. The system of claim 8, wherein the processor is configured to perform at least one operation based on the determined user gesture context.

10. The system of claim 9, wherein the processor is configured to perform scrolling based on the determined user gesture context.

11. The system of claim 9, wherein the processor is configured to perform selecting based on the determined user gesture context.

12. The system of claim 9, wherein the processor is configured to perform zooming based on the determined user gesture context.

13. The system of claim 9, wherein the processor is configured to apply the at least one operation to an active application.

14. A computer system comprising:
a computer including a processor and configured to be in communication with a display screen;
at least one sensor in communication with the processor and configured to detect when a user is absent, when a single user is present, and when multiple users are present;
wherein the processor is configured to place the computer in a non-use mode when the user is absent, wherein the non-use mode comprises at least one of a sleep mode, a hibernate mode, or a user logged out mode;
wherein the processor is configured to place the computer in a public mode when the multiple users are present and wherein, when the computer is in the public mode, private content is not displayed on the display screen; and
wherein the processor is configured to place the computer in a private mode when the single user is present and wherein, when the computer is in the private mode, the private content is displayed on the display screen.

15. The system of claim 14, wherein the at least one sensor is configured to detect at least one of depth, distance, proximity and presence of a user relative to the computer.

16. The system of claim 14, wherein the processor is configured to close one or more windows to place the computer in the public mode.

17. The system of claim 14, wherein the processor is configured to disable an active application of the computer to place the computer in the public mode.

18. The system of claim 14, wherein the at least one sensor is configured to detect a user parameter relative to the computer and wherein the processor is configured to determine a user gesture context based on the detected user parameter.

19. The system of claim 18, wherein the processor is configured to perform at least one operation based on the determined user gesture context.

20. The system of claim 19, wherein the processor is configured to perform scrolling based on the determined user gesture context.

21. The system of claim 19, wherein the processor is configured to perform selecting based on the determined user gesture context.

22. The system of claim 19, wherein the processor is configured to perform zooming based on the determined user gesture context.

23. The system of claim 19, wherein the processor is configured to apply the at least one operation to an active application.

24. A computer user interface system, comprising:
a computer including a processor;
at least one sensor coupled to the processor and configured to detect a user parameter relative to the computer,
wherein the processor is configured to determine a user context based on the detected user parameter and a user presence context based on the detected user parameter;
wherein when the user presence context indicates absence of a user from a vicinity of the computer, the processor places the computer in a non-use mode, wherein the non-use mode comprises at least one of a sleep mode, a hibernate mode, or a user logged out mode;
wherein the processor is configured to determine a user proximity context based on the detected user parameter; and
wherein the processor is configured to alter a content of information displayed by the computer based on the determined user proximity context.

25. A method for operating a computer system, wherein the computer system includes a computer having a processor and configured to be in communication with a display screen and at least one sensor configured to be in communication with the processor, the method comprising:
with the at least one sensor, detecting the absence of a user within a vicinity of the computer;
with the processor, placing the computer in a non-use mode when the absence of the user is detected, wherein the non-use mode comprises at least one of a sleep mode, a hibernate mode, or a user logged out mode;
with the at least one sensor, detecting a single user within a vicinity of the computer;

with the processor, displaying private content on the display screen when the single user is detected within the vicinity of the computer;

with the at least one sensor, detecting at least first and second users within the vicinity of the computer; and with the processor, hiding the private content from view when the at least first and second users are detected within the vicinity of the computer.

26. The method defined in claim 25 further comprising:

with the at least one sensor, detecting the absence of a user from the vicinity of the computer; and with the processor, placing the computer in a non-use mode in response to detecting the absence of the user from the vicinity of the computer, wherein the non-use mode comprises at least one of a sleep mode, a hibernate mode, or a user logged out mode.

27. The method defined in claim 25 wherein detecting the single user within the vicinity of the computer comprises detecting the single user within the vicinity of the computer using a sensor selected from the group consisting of: a visible light sensor, an ambient light sensor, and a vibration sensor.

28. The method defined in claim 25 wherein hiding the private content from view comprises:

with the processor, closing one or more windows on the display screen.

29. The method defined in claim 25 wherein hiding the private content from view comprises:

with the processor, disabling one or more active applications.

* * * * *